US007422785B2

(12) United States Patent
Ogawa et al.

(10) Patent No.: US 7,422,785 B2
(45) Date of Patent: Sep. 9, 2008

(54) MASKING MATERIAL

(75) Inventors: Masanori Ogawa, Tokai (JP); Kuninori Itou, Tokai (JP)

(73) Assignee: Nagoya Oilchemical Co., Ltd., Aichi (JP)

( * ) Notice: Subject to any disclaimer, the term of this patent is extended or adjusted under 35 U.S.C. 154(b) by 303 days.

(21) Appl. No.: 10/510,561

(22) PCT Filed: Mar. 20, 2003

(86) PCT No.: PCT/JP03/03484

§ 371 (c)(1), (2), (4) Date: Oct. 7, 2004

(87) PCT Pub. No.: WO03/084675

PCT Pub. Date: Oct. 16, 2003

(65) Prior Publication Data

US 2005/0175797 A1 Aug. 11, 2005

(30) Foreign Application Priority Data

Apr. 9, 2002 (JP) ............................ 2002-106614

(51) Int. Cl.
*B32B 3/24* (2006.01)
*B05C 11/115* (2006.01)

(52) U.S. Cl. ........................ 428/139; 428/140; 118/505

(58) Field of Classification Search ................ 428/139, 428/140; 118/505
See application file for complete search history.

(56) References Cited

U.S. PATENT DOCUMENTS 2,328,203 A * 8/1943 Duggan ...................... 118/505
4,871,585 A * 10/1989 Kano et al. ................ 427/98.5
5,753,042 A * 5/1998 Bauer .......................... 118/504
5,902,642 A * 5/1999 Horiki et al. ................ 427/282

FOREIGN PATENT DOCUMENTS

JP 05111670 A * 5/1993

* cited by examiner

*Primary Examiner*—William P Watkins, III
(74) *Attorney, Agent, or Firm*—Cooper & Dunham LLP

(57) ABSTRACT

The object of the present invention is to protect completely a part of an article having penetrating hole(s) from a surface treatment.

To attain said object, a masking member (1A), having fitting part(s) (11A) to fit into said hole(s) of said article, the bottom end(s) of said fitting part(s) reaching the end(s) of said hole(s), and flange(s) (13A) being formed around bottom end(s) of said fitting part(s) around the circumference(s) of said hole(s), is provided. When said masking member (1A) is attached to said part by fitting said fitting part(s) of said masking member (1A) into said hole(s), the bottom end(s) of said fitting part(s) of said masking member (1A) reach(s) the opposite side(s) of said hole(s), and flange(s) (3A) around the bottom end(s) of said fitting part(s) of said masking member (1A) cover(s) circumference(s) of said hole(s), to protect the inside(s) of said hole(s) from paint mist circulating around said article, and from reaching the opposite side(s) of said article, when said article is being spray coated with paint.

6 Claims, 6 Drawing Sheets

MASKING MATERIAL

FIELD OF THE INVENTION

The present invention relates to a masking member used to protect a part of an article upon which a surface treatment such as paint coating, plating or the like, should not be effected.

BACKGROUND OF THE INVENTION

When a part of an article is to be protected from a surface treatment such as paint coating, adhesive tape has generally been used to cover said part, after which said surface treatment has been carried out. However, the attaching of said adhesive tape to said part is troublesome. To solve said problem, a masking member made of plastic has been provided, said masking members (9A, 9B), each having a cylindrical fitting part (91A) as shown in FIG. 9 or a box type fitting part (9B) as shown in FIG. 10, to fit said fitting parts (91A) or (91B) into holes (22A, 22B) of the part to be protected and said masking member (9A, 9B) being attached to said parts by fitting each of said fitting parts (91A, 91B) into said hole(s) (22A, 22B).

However, said conventional masking members (9A, 9B) are imperfect in that when an article is coated with spray paint, paint mist circulates around said article, reaching the opposite side of said article, and contaminating the inside(s) of said holes (22A, 22B) in which paint coating should not be effected, as shown in FIGS. 9 and 11.

Patent Literature

Registered utility model No. 2566769

DISCLOSURE OF THE INVENTION

To solve said problems of said conventional masking member, the present invention provides a masking member (1A, 1B) to be attached to a part of an article having penetrating hole(s) (22A, 22B), wherein said masking member (1A, 1B) has fitting part(s) (11A, 11B) to fit into said hole(s) (22A, 22B) and the bottom end(s) of said fitting part(s) (11A, 11B) reach(s) the opposite side(s) of said hole(s) (22A, 22B), and the flange(s) (13A, 13B) is(are) formed around bottom end(s) of said fitting part(s) (11A, 11B) to cover the circumference(s) of said hole(s) (22A, 22B).

When said masking member (1A or 1B) is attached to a part of an article to be protected from a surface treatment, by fitting said fitting part (11A or 11B) into a hole (22A or 22B) penetrating said part, the bottom end of said fitting part (11A or 11B) reaches the opposite side of said hole (22A or 22B) and said flange (13A or 13B) around said fitting part (11A or 11B) covers the circumference of said hole (22A or 22B) to protect said article from paint mist circulating around it, reaching the opposite side of said article, or contaminating the inside of said hole (22A or 22B) when said article is being coated with spray paint.

DESCRIPTION OF LETTERINGS

1A, 1B Masking Members
11A, 11B Fitting Parts
13A, 13B Flanges
22A, 21B Masking Parts (Air Inlet)
22A, 22B Penetrating Holes

PREFERED EMBODIMENTS OF THE INVENTION

The present invention is described precisely below.

Figure 1:
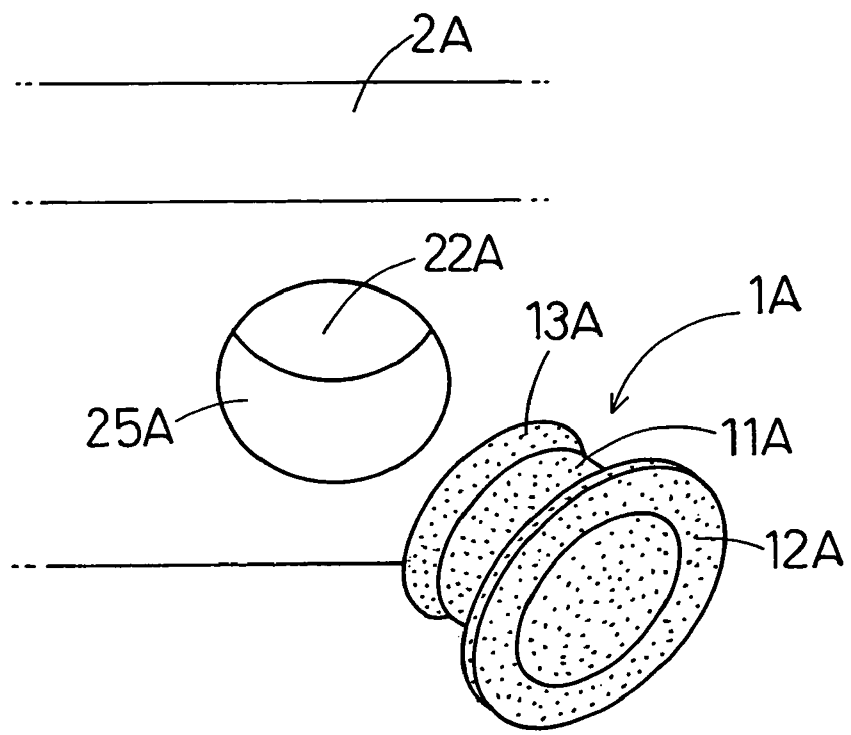
FIG. 1 shows a perspective view of said masking member with a penetrating hole, illustrating the first embodiment of the present invention.
Figure 2:
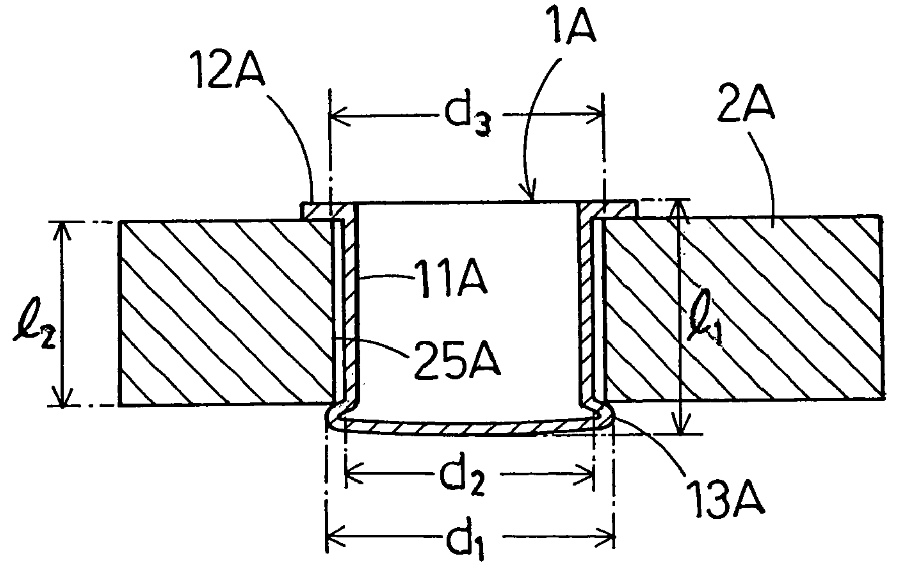
FIG. 2 shows a sectional view of a case in which said masking member is fitted, illustrating an altered example of the first embodiment of the present invention.

FIGS. 1 and 2 relate to the first embodiment of the present invention. In this embodiment, a masking member (1A) is used to protect a penetrating hole such as a female screw hole (22A) passing through an area upon which a surface treatment is to be performed.

Said masking member (1A) consists of a cylindrical body (11A) with a bottom, a narrow collar (12A) formed around the opening end of said cylindrical body (11), and a flange (13A) extending from the circumference of the bottom side of said cylindrical body (11A).

The outer diameter $d_2$ of said cylindrical body (11) is settled to be a little smaller than the diameter $d_3$ of said female screw hole (22A) which is protected by said masking member (1A), with the outer diameter $d_1$ of said flange (13A) being settled to be a little greater than the diameter $d_3$ of said female screw hole (22A) ($d_2<d_3<d_1$). Further, the length $l_1$ of said masking member (1A) is settled to be a little longer than the length $l_2$ of said female screw hole (2) ($l_2<l_1$).

As the material for said masking member, for instance, a polyolefin such as polyethylene, polypropylene, polypropylene-polyethylene compound, ethylene-propylene copolymer, ethylene-vinyl actetate copolymer or the like a thermoplastic engineering plastics such as polyvinyl chloride type resin, styrenic resin, acrylic resin, methacrylic resin, polyvinylidene chloride resin, vinyl propionate resin, styrene-butadiene copolymer, thermoplastic polyester resin, thermoplastic polyamide resin, acrylonitrile-butadiene-styrene copolymer(ABS), acrylonitrile-polyvinyl chloride-styrene copolymer(ACS), acrylonitrile-butadiene-styrene-N-phenylmaleimide copolymer, styrene-maleic anhydride copolymer, styrene-acrylonitrile copolymer, acrylonitrile-styrene-acrylate ester copolymer, methacrylic methyl-butadiene-styrene copolymer, syndiotactic polystyrene polymerized using metallocene compound (SPS), isotactic polystyrene(IPS), polyacetal(POM), polysulfone(PSF), polyethersulfone(PES), polyphenylene ether(PPE), modified polyphenylene ether ((Modified PPE), polyphenylene sulfide(PPS), polyarylate (PAR), polyether-etherketone(PEEK), polyamideimide (PAI), polyimide(PI), polyetherimide(PEI), polyaminobismaleimide, methylpentene copolymer(TPX) or the like; a liquid crystallic engineering plastic such as polyarylether or the like; a compressive moldability type engineering plastic of fluororesin such as polytetrafluororthylene (PTFE) or the like; a thermoplastic plastics or engineering plastic such as amorphous polymer, polyamindebismaleimide, bismaleimide-triazine thermoset aromatic polyimide, acrylate rubber-acrylonitrile-styrene copolymer(AAS), acrylonitrile-ethylene/propylene rubber-styrene copolymer (AES), metallocene polypropylene, metallocene polyethylene, methylmethacrylate-butadiene-styrene copolymer (MBS), polyamide(PA), polycarbonate(PC), polyethylene terephthalate(PET), crystalline,polyethylene terephthalate, crystalline polybutylene terephthalate or the like, is used.

Said modified PPE is a graft copolymer in which a styrenic monomer such as styrene, α-methylstyrene, α-ethylstyrene, α-methylvinyltoluene, α-methyldialkylstyrene, o, m or p-vinyltoluene, o-ethylstyrene, p-ethylstyrene, 2,4-dimethylstyrene, o-chlorostyrene, p-chlorostyrene, o-bromstyrene, 2,4-dichlorostyrene, 2-chloro-4-methylstyrene, 2,6-dichlorostyrene, vinylnaphthalene, vinylanthracene or the like is graft polymerized to PPE, or a polymer alloy in which styrenic resin such as polystyrene, styrene-acrylonitrile resin, acrylonitrile-butadiene-styrene resin (ABS), high impact polystyrene (HIPS), or the like is mixed in with PPE.

Said resin alone, or a polymer alloy or polymer blend of two or more kinds of said resin combined together is used as the material for said masking member (1A). Still more, when two or more kinds of resin are used together, a compatibility aid agent may be used to improve the resins' compatibility.

Further, a rubber-like material such as synthetic rubber, such as acrylic rubber(AR), butyl rubber(BR), silicone rubber, urethane rubber(UR), fluoride group rubber, polysufide group rubber, graft rubber, butadiene rubber(BR), isoprene rubber(IR), chloroprene rubber(CR), polyisobutylene rubber (IBR), polybutene rubber, isobutene-isoprene rubber(IIR), acrylate-butadiene rubber(ABR), styrene-butadiene rubber (SBR), acrylonitrile-butadiene rubber(NBR), pyridine-butadiene rubber(PBR), styrene-isoprene rubber(SIR), acrylonitrile-chloroprene rubber styrene-chloroprene rubber or the like; natural rubber; styrenic elastomer such as styrene-butadiene-styrene block copolymer(SBS), styrene-isoprene-styrene block copolymer(SIS), α-methylstyrene-butadiene-α-methylstyrene block copolymer(α-MeS-Bd-MeS), α-methylstyrene-isoprene-α-methylstyrene block copolymer, styrene-hydrogenated polyolefin-styrene copolymer (SEBS,SEPS) or the like; a rubber-like substance such as polyolefin group elastomer, polyurethane group elastomer, polyester group elastomer, polyamide group elastomer or the like, may be added to said resin as the material for said masking member (1A), to improve flexibility, moldability, and the like.

A polymer blend or a polymer alloy of said engineering plastic and said thermoplastic resin, or a polymer blend or a polymer alloy of said engineering plastic, said thermoplastic resin, and said rubber-like material are preferably used as the material for said masking member (1A).

A polymer alloy of said engineering plastic and polyamide, and/or polystyrene, and/or polypropylene is especially preferable as the material for said masking member.

As said polyamide, for instance, said polyamide is such as: poly(tetramethylene adipamide) (nylon 46), poly(hexamethylene adipamide) (nylon 66), polypyrrolidone (nylon 4), poly caprolactam (nylon 6), polyheptolactam (nylon 7), polycaprilactam (nylon 8), polynonanolactam (nylon 9), polyundeca 1 lactam (nylon 11), polydodeca 1 lactam (nylon 12), polyhexamethylene azelaic acid amide (nylon 69), polyhexamethylene sebacic acid amide (nylon 610), polyhexamethylene phthalamide (nylon 6iP), polyhexamethylene terephthalamide, polyhexamethyleneisophthalamide, polytetramethyleneisophthalamide, poly(m-xylene adipamide), nylon MSD6, polyamide consisting of hexamethylenediamine and n-dodecanedioic acid (nylon 612), polyamide consisting of dodecamethylenediamine and n-dodecanedioic acid (nylon 1212), hexamethylene adipamide/caprolactam (nylon 66/6), hexamethylene adipamide/hexamethyleneisophthalamide (nylon 66/nylon 6iP), hexamethylene adipamide/hexamethyleneterephthalamide (nylon 66/nylon 6T), trimethylhexamethylene oxide/hexamethylene oxide (nylontrimethyl-62/62), hexamethylene adipamide/hexamethylene azelaic acid amide (nylon 66/nylon 69), hexamethylene adipamide/hexamethylene azelaic acid amide/caprolactam (nylon 66/nylon 69/nylon 6), poly(capronamide/hexamethylene sebacic acid amide) (nylon 6/610), poly(capronamide/hexamethylene-dodecanoic acid amide) (nylon 6/612), nylonMXD6, poly (capronamide/hexamethyleneisophthalamide) (nylon 6/6I), aromatic polyamide and the like is used, and as said polystyrene, both general purpose polystyrene and high impact polystyrene may be used as the material for said masking member, however, high impact polystyrene is preferable.

Further, one or more kinds of styrenic thermoplastic elastomer is (are) used in the present invention. Said thermoplastic elastomer may include styrene-butadiene-styrene block copolymer (SBS), styrene-isoprene-styrene block copolymer (SIS), α-methylstyrene-butadiene-α-methylstyrene block copolymer (α-MeS-Bd-MeS), α-methylstyrene-isoprene-α-methylstyrene block copolymer, styrene-hydrogenated polyolefin-styrene block copolymer (SEBS) or the like may be added to said polymer alloy.

Further, a rubber component may be added to said polymer alloy to prepare a rubber modified polymer alloy.

Furthermore, in said plastic material, a filler may be added to improve the mechanical properties such as moldability, shape holding, dimensional stability, compression and tensile strength, and for coloration, or the like. Said reinforcing material is such as: an inorganic filler such as calcium carbonate, magnesium carbonate, barium sulphate, calcium sulphate, calcium sulfite, calcium phosphate, calcium hydroxide, magnesium hydroxide, aluminum hydroxide, magnesium oxide, titanium oxide, iron oxide, zinc oxide, alumina, silica, diatom earth, dolomite, gypsum, talc, clay, asbestos, mica, glass fiber, carbon fiber, calcium silicate, calcium carbonate, bentonite, white carbon, carbon black, iron powder, aluminum powder, stone powder, blast furnace slag, fly ash, cement, zirconia powder or the like; natural fiber such as cotton, hemp, bamboo fiber, coconut fiber, wool and the like; organic synthetic fiber such as polyamide fiber, polyester fiber, acrylic fiber, viscose fiber, acetate fiber, vinyl chloride fiber, vinylidene choloride fiber or the like; inorganic fiber such as asbestos fiber, glass fiber, carbon fiber, ceramic fiber, metallic fiber, whisker or the like; an organic filler such as linter, linen, sisal, wood flour, coconut flour, walnut flour, starch, wheat flour or the like, a plasticizer such as a DOP, a DBP or the like, an antioxidant, antistatic agent, crystallization agent, flame retardant, antiflaming agent, insecticide, antiseptic, waxes, a lubricant, age resister, ultraviolet absorber, blowing agent such as a chemical blowing agent or capsule type blowing agent, or the like. Two or more kinds of said agent may be mixed with each other and then added to said plastic material of said masking member.

To mold said masking member (1A), vacuum forming, pressure forming, vacuum-pressure forming, pressure molding, injection molding, or any method that is applicable, may be applied, and said masking member (1A) can be effectively mass-produced by the vacuum forming or pressure forming of said thermoplastic resin sheeting or film, or of said foamed thermoplastic resin sheeting or film. In addition to said plastic material, thick paper, used card board, metal, fiber board, or the like may be used as the material for said masking member (1A).

Said masking member (1A) is fitted into said female screw hole (22A) before paint coating of said part (2A). Since said masking member (1A) is made of said plastic material, or the like, and the diameter $d_1$ of said flange (13A) is settled to be a little greater than the diameter $d_3$ of said female screw hole (22A), when said masking member (1A) is pushed into said female screw hole (22A), said cylindrical body (11A) and said flange (13A) may alter elastically to fit into said female screw hole (22A) easily. Said cylindrical body (11A) and said flange (13A) elastically recover after the fitting of said masking member (1A) into said female screw hole (22A), said flange (13A) engaging with the circumference of said female screw hole (22A).

Further, since the length $l_2$ of said cylindrical body (11A) is settled to be a little greater than the length $l_2$ of said female screw hole (22A), said masking member (1A) is fixed into said female screw hole (22A) by said collar (12A) and said flange (13A), so that said masking member (1A) will not come out of from said female screw hole, even under the pressure of spray coating being effected on said masking member (1A).

Said part (2A), in whose female screw hole (22A) said masking member (1A) is fitted, is coated with a spray paint or the like. Since the outer diameter $d_2$ of said flange (13A) of said masking member (1A) is settled to be a little greter than the diameter $d_3$ of said female screw hole (22A), the circumference of said female screw hole (22A) is completely covered by said flange (13A), protecting said part (2A), from circulating paint mist reaching its opposite side, or entering said female screw hole (22A).

After spray coating with paint, if desired, the resulting paint film on said part (2A) is heat dried, after which said masking member (1A) is removed from said female screw hole (22A). When said masking member (1A) is pulled out of said female screw hole (22A), said masking member (1A) may elastically alter, so that said masking member (1A) is easily removed from said female screw hole (22A).

Figure 3:
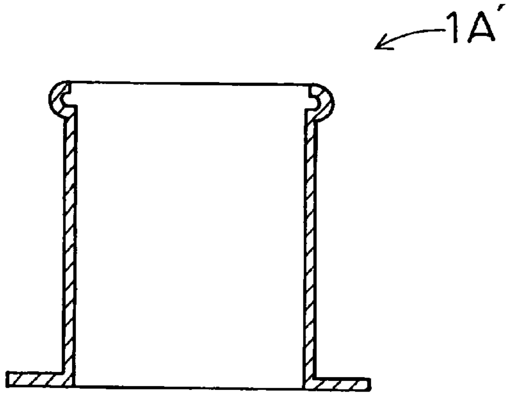
FIG. 3 shows a sectional view of said masking member, illustrating the first embodiment of the present invention.

Said masking member (1A) can be used repeatedly. In this embodiment, said cylindrical body (11A) of said masking member (1A) has a bottom, but a bottomless cylindrical masking member or a cylindrical masking member (1A') with openings at either end as shown in FIG. 3 can also be used in the present invention.

Figure 4:
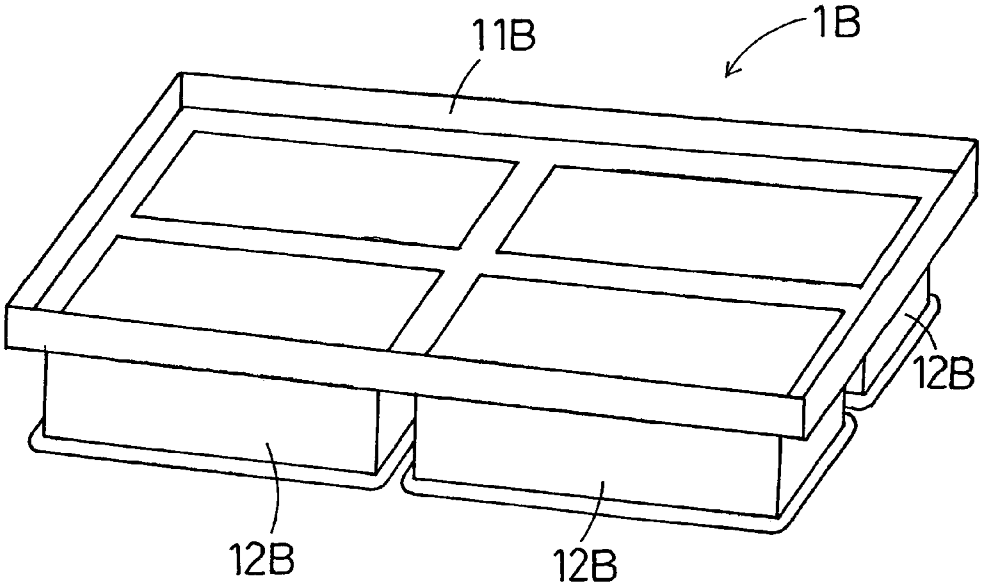
FIG. 4 shows a perspective view of said masking member, illustrating the second embodiment of the present invention.
Figure 5:
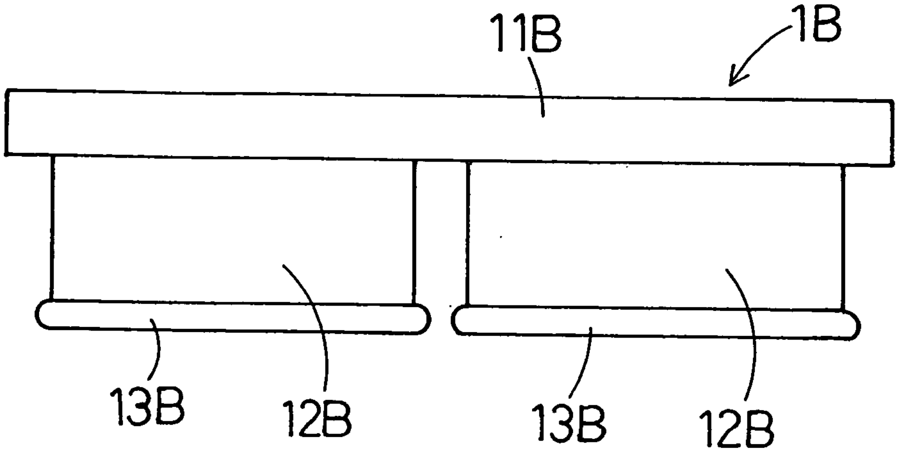
FIG. 5 shows a side view of said masking member, illustrating the second embodiment of the present invention.
Figure 6:
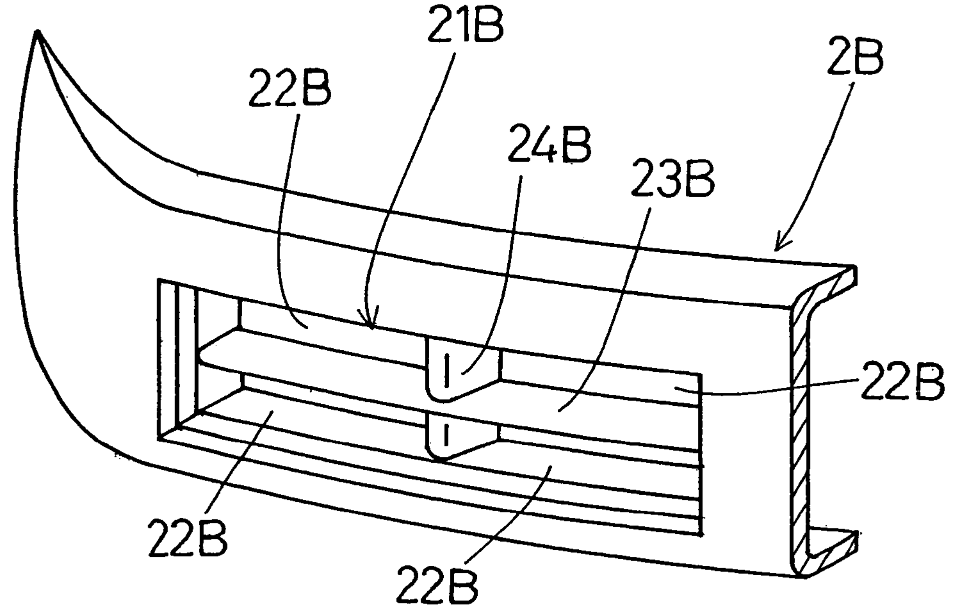
FIG. 6 shows a perspective view of a bumper (the member to be masked), illustrating the second embodiment of the present invention.
Figure 7:
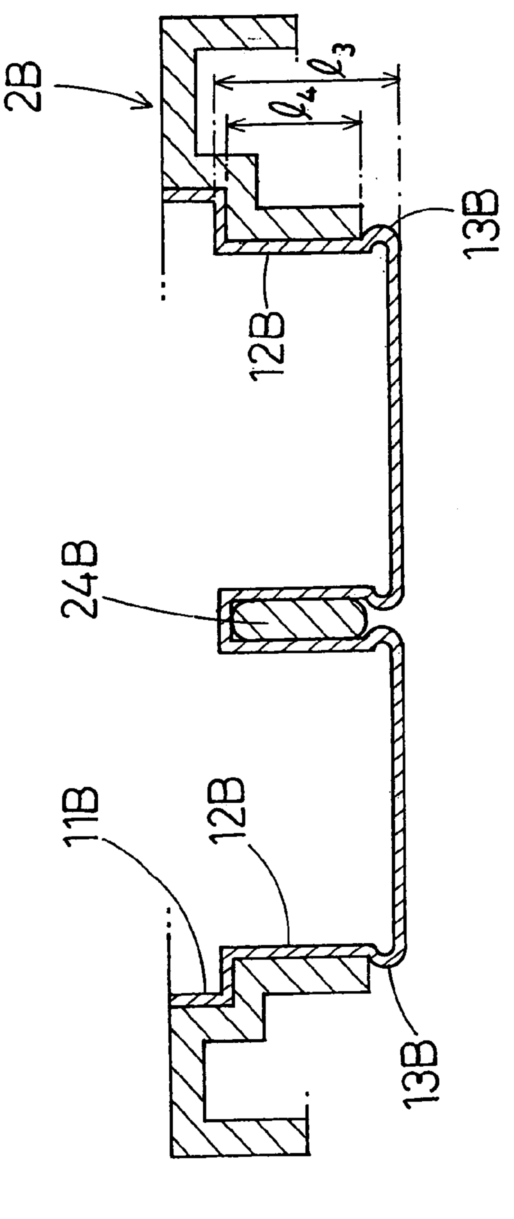
FIG. 7 shows a sectional side view of a case in which said masking member is fitted, illustrating the second embodiment of the present invention.
Figure 8:
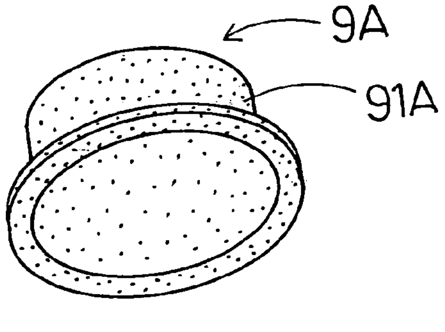
Fig. 8 PRIOR ART
FIG. 8 shows a perspective view of a conventional making member.
Figure 9:
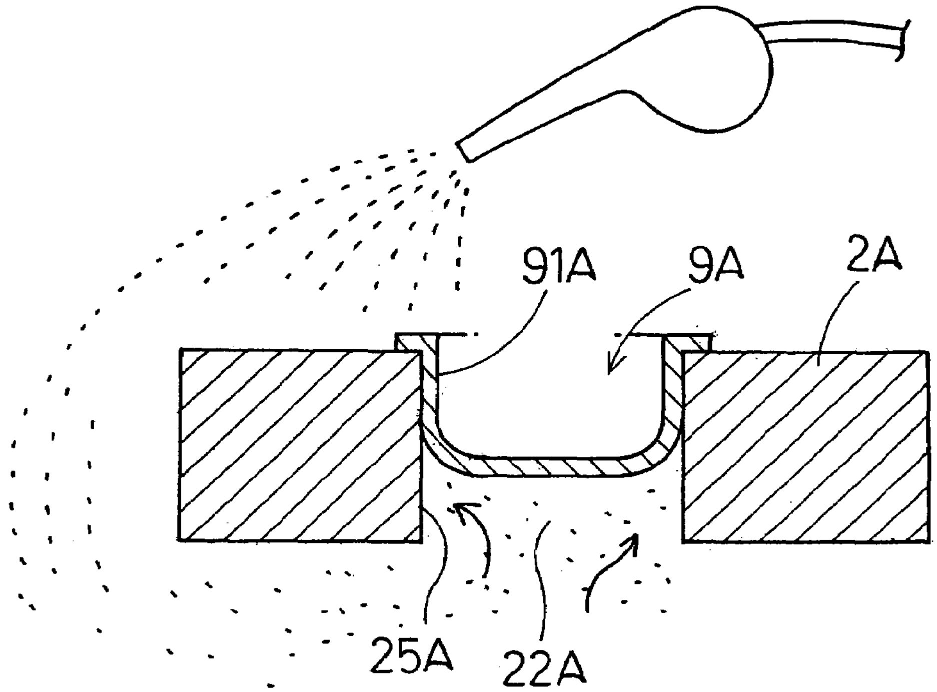
Fig. 9 PRIOR ART
FIG. 9 shows a sectional view of a case in which a conventional masking member is fitted.
Figure 10:
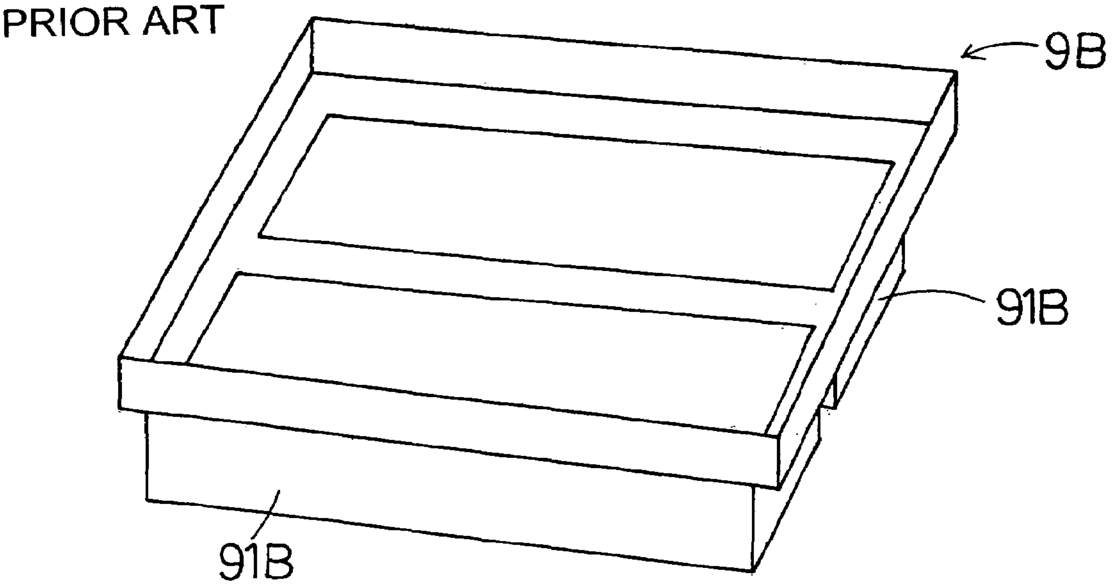
Fig. 10 PRIOR ART
FIG. 10 shows a perspective view of a conventional masking member.
Figure 11:
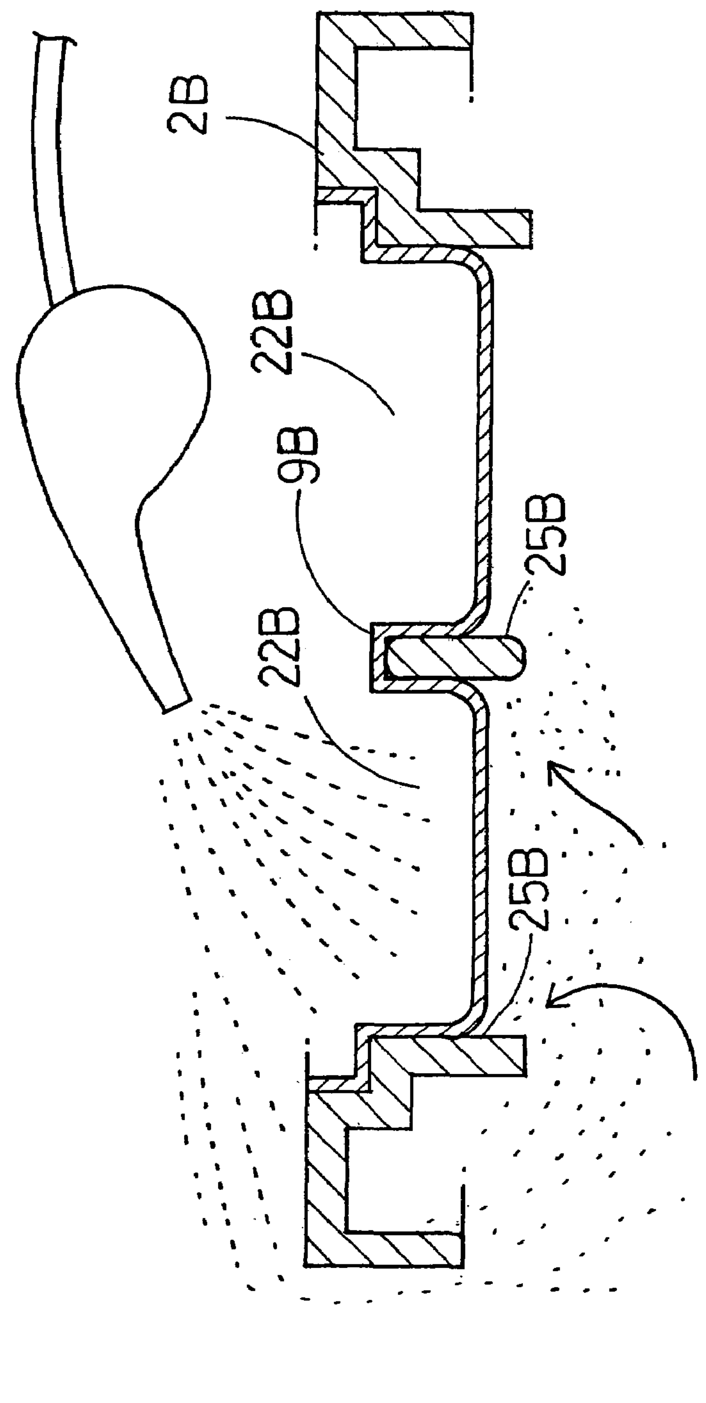
Fig. 11 PRIOR ART
FIG. 11 shows a sectional view of a case in which a conventional masking member is fitted.

FIGS. 4 to 7 relate to the second embodiment of the present invention. The masking member (1B) shown in FIGS. 4 and 5 is used to protect the air-inlet openings (21B) of a car bumper (2B) as shown in FIG. 6, from paint coating.

Said car bumper (2B) has an air-inlet opening (21B) which is to be protected by said masking member (1B), and lateral beam (23B) and longitudinal beam (24B) extend across said air-inlet openings (21B), dividing them into four square opening parts (22B, 22B, 22B, 22B).

Said masking member (1B) consists of a body (11B) having a shallow box shape from whose bottom four fitting parts (12B, 12B, 12B, 12B) having a rectangular parallel piped box shape, are formed. The circumference of each fitting part (12B) is settled to be a little smaller than the circumference of said opening part (22B) and depth $l_3$ of each fitting part (12B) is settled to be a little greater than the depth $l_4$ of said opening part (22B).

Further, the circumference of the bottom of each fitting part (12B) extend outward to form a flange (13B) and the circumference of each flange (13B) is settled to be a little greater than the circumference of said opening part (22B).

Said masking member (1B) is made of the same material as in the first embodiment and manufactured using the same method as in the first embodiment.

To attach said masking member (1B) to said air-inlet opening (21B), said body (11B) of said masking member (1B) is fit into said air-inlet opening (21B) snugly, said fitting parts (12B, 12B, 12B, 12B) of said masking member (1B) each fitting into said opening parts (22B, 22B, 22B, 22B).

Since each fitting part (12B) is made of plastic or the like and the circumference of each flange (13B) is settled to be a little greater than the circumference of said opening part (22B), when said fitting part (12B) with said flange (13B) is pushed into said opening part (22B), said fitting part (12B) with said flange (13B) may elastically alter, so that said fitting part (12B) with said flange (13B) is easily fitted into said opening part (22B).

Further, since the depth $l_3$ of each fitting part (12B) is settled to be a little greater than the depth $l_4$ of said opening part (22B), when said fitting part (12B) is fitted into said opening part (22B), said fitting part (12B) with said flange (13B) elastically recover, with said flange (13B) engaging with the circumference of said opening part (22B). Accordingly each fitting part (12B) is fixed firmly into said opening part (22B), so that said masking member (1B) will not come out of said air-inlet hole (21B), even when spray pressure is exerted on said masking member (1B) during paint coating.

Said bumper (2B), to which said masking member (1B) is attached, is coated with paint. Since said flange (13B) is formed around the circumference of the bottom end of each fitting part (12B) of said masking member (1B), with the circumference of said flange (13B) settled to be a little greater than that of said opening part (22B), the circumference of each opening part (22B) is completely covered by said flange (13B).

Said bumper (2B), to which said masking member (1B) is attached, is coated with a spray paint or the like, the backside of said bumper (2B), and opening part (22B) being protected from circulating paint mist contamination by said flange (13B).

After coating, said masking member (1B) is removed by pulling it out of said air-inlet opening (21B). When said masking member is pulled out of said air-inlet opening (21B), each fitting part (12B) and flange (13B) may elastically alter so that said masking member (1B) can be easily removed from said air-inlet to opening (21B) of said bumper (2B).

Said masking member (1B) of the present invention can be used repeatedly.

The masking member of the present invention should not be limited only to the masking members in said embodiment, and any masking member satisfying the necessary structural conditions of the present invention, and made of any kind of material can be used in the present invention, the masking member of the present invention being applicable to protect any kind of article having penetrating holes.

INDUSTRIAL UTILITY

By using the masking member of the present invention, the hole(s) penetrating said article is (are) completely protected from surface treatment.

The invention claimed is:

1. A masking member attached to a part of an article having at least one open hole penetrating said part from a first to a second side of the part, and the first side of said article is to be coated with spray paint, wherein:

said masking member is formed by vacuum and/or pressure forming a thermoplastic resin sheet or film and comprises:

(a) at least one fitting part that fits into said at least one open hole and has a first side and a second side, (b) a collar at the first side of said fitting part, at least a part of said collar being at the first side of said part, outside of said at least one hole, and having a predetermined circumference greater than the hole at said first side of the part, and (c) a hollow flange at the second side of said fitting part, at least a part of the flange being at the second side of said part, outside of said at least one hole, and also having a predetermined circumference greater than the hole at said second side of the part to cover the circumference of the second side end of the hole to protect against paint mist invading the hole from the second side end of the hole;

wherein said collar and said flange protect said at least one open hole from contamination by material used to apply surface treatment to said part; and at least one of said collar and said flange is sufficiently elastic and resilient to deform for insertion of the masking member into said at least one open hole such that at least a part of each of the collar and the flange is outside of the hole and extends beyond the circumference of the hole.

2. A masking member as in claim 1 attached to a part having a single open hole, wherein said masking member has a single fitting part, single collar, and a single flange.

3. A masking member as in claim 1 in which said fitting member, collar and flange are generally circular.

4. A masking member as in claim 1 attached to a part having multiple open holes, wherein said masking member comprises multiple fitting parts fitting into respective ones of said open holes, and multiple flanges each having at least a portion that surrounds a respective one of said open holes at the second side of the part.

5. A masking member as in claim 4 in which said collar comprises a single body having at least a portion that surrounds all of said multiple holes at the first side of the part to protect them from contamination by material used to apply surface treatment to said part.

6. A masking member as in claim 1 in which said masking member is sufficiently elastic and resilient for insertion into and withdrawal from said at least one hole for multiple uses of said masking member and in which said at least one fitting part has a cross-section equal to or smaller than that of said at least one hole.

* * * * *